United States Patent
Keshavaraj et al.

(10) Patent No.: US 6,473,948 B1
(45) Date of Patent: *Nov. 5, 2002

(54) AIR BAG FABRIC POSSESSING IMPROVED PACKED VOLUME CHARACTERISTICS

(75) Inventors: Ramesh Keshavaraj, LaGrange, GA (US); Michael D. Hurst, LaGrange, GA (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,825

(22) Filed: Apr. 17, 1997

(51) Int. Cl.[7] ............................................. D06C 21/00
(52) U.S. Cl. ........................................ 26/18.6; 442/181
(58) Field of Search ................................. 442/189, 182, 442/181; 428/36.1, 35.2, 35.5; 280/728.1; 139/389; 26/18.5, 18.6; 28/116, 122, 140, 155, 156, 134–139

(56) References Cited

U.S. PATENT DOCUMENTS

| | | | | |
|---|---|---|---|---|
| 2,078,904 A | * | 4/1937 | Cluett | 26/18.6 |
| 3,131,118 A | * | 4/1964 | Dabroski et al. | 26/18.6 |
| 3,538,563 A | * | 11/1970 | Tsuruta et al. | 26/18.6 |
| 3,596,333 A | * | 8/1971 | Tsuruta et al. | 26/18.6 |
| 3,814,141 A | | 6/1974 | Iribe et al. | 139/127 |
| 4,051,215 A | * | 9/1977 | Tsuruta et al. | 26/18.6 |
| 4,921,735 A | * | 5/1990 | Bloch | 428/34.9 |
| 4,932,107 A | * | 6/1990 | Gotoh et al. | 28/137 |
| 4,969,243 A | * | 11/1990 | Strahm | 26/18.6 |
| 5,010,663 A | * | 4/1991 | Thornton et al. | 280/728.1 |
| 5,011,183 A | | 4/1991 | Thornton et al. | 280/743 |
| 5,073,418 A | | 12/1991 | Thornton et al. | 428/34.9 |
| 5,093,163 A | | 3/1992 | Krummheuer et al. | 428/35.1 |
| 5,110,666 A | | 5/1992 | Menzel et al. | 428/196 |
| 5,236,775 A | | 8/1993 | Swoboda et al. | 428/225 |
| 5,259,645 A | | 11/1993 | Hirabayashi et al. | 280/743 |
| 5,277,230 A | | 1/1994 | Sollars, Jr. | 139/389 |
| 5,296,278 A | * | 3/1994 | Nishimura et al. | 28/116 |
| 5,356,680 A | | 10/1994 | Krummheuer et al. | 428/36.1 |
| 5,375,878 A | | 12/1994 | Ellerbrok | 280/743 |
| 5,421,378 A | | 6/1995 | Bowers et al. | 139/435.1 |
| 5,477,890 A | | 12/1995 | Krummheuer et al. | 139/291 |
| 5,503,197 A | | 4/1996 | Bower et al. | 139/435.1 |
| 5,508,073 A | | 4/1996 | Krummheuer et al. | 428/35.1 |
| 5,540,965 A | * | 7/1996 | Nishimura et al. | 26/18.6 |
| 5,566,434 A | | 10/1996 | Beasley | 28/112 |
| 5,581,856 A | * | 12/1996 | Krummheuer et al. | 26/18.5 |
| 5,989,660 A | * | 11/1999 | Moriwaki et al. | 442/184 |
| 6,182,709 B1 | * | 2/2001 | Konishi et al. | 139/1 R |

* cited by examiner

Primary Examiner—Amy B. Vanatta
(74) Attorney, Agent, or Firm—Terry T. Moyer; William S. Parks

(57) ABSTRACT

A fabric for use in an air bag is provided. The fabric of the invention is produced by mechanically compressing a preliminary fabric constructed substantially of synthetic yarn such that the packed volume per unit area of the compressed fabric is less than the packed volume per unit area of the preliminary fabric. Air permeability is not adversely affected.

5 Claims, 3 Drawing Sheets

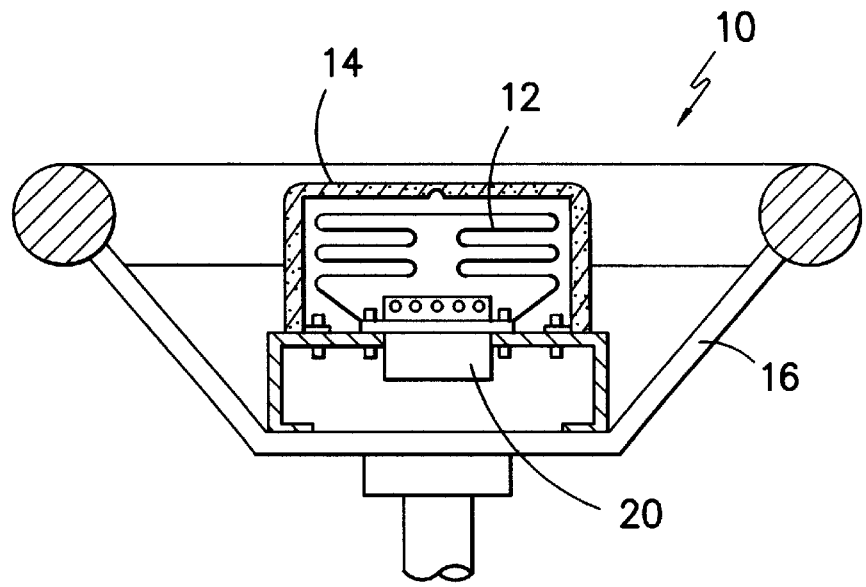
FIG. -1-
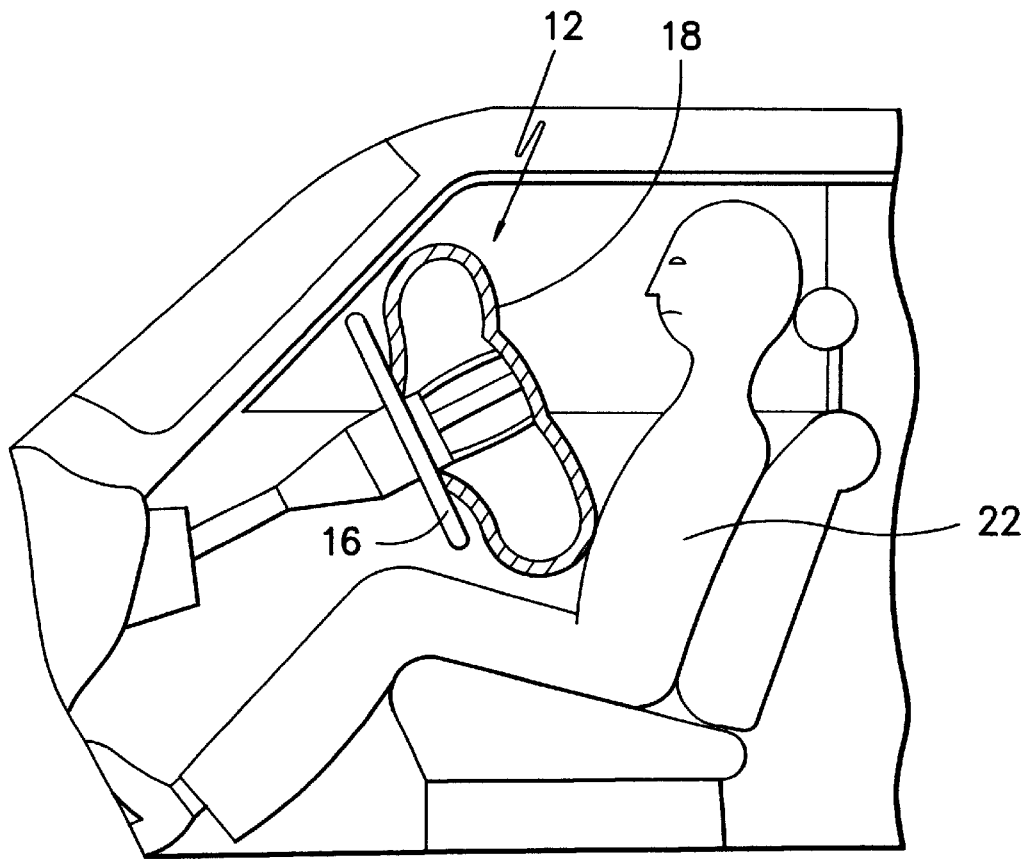
FIG. -2-

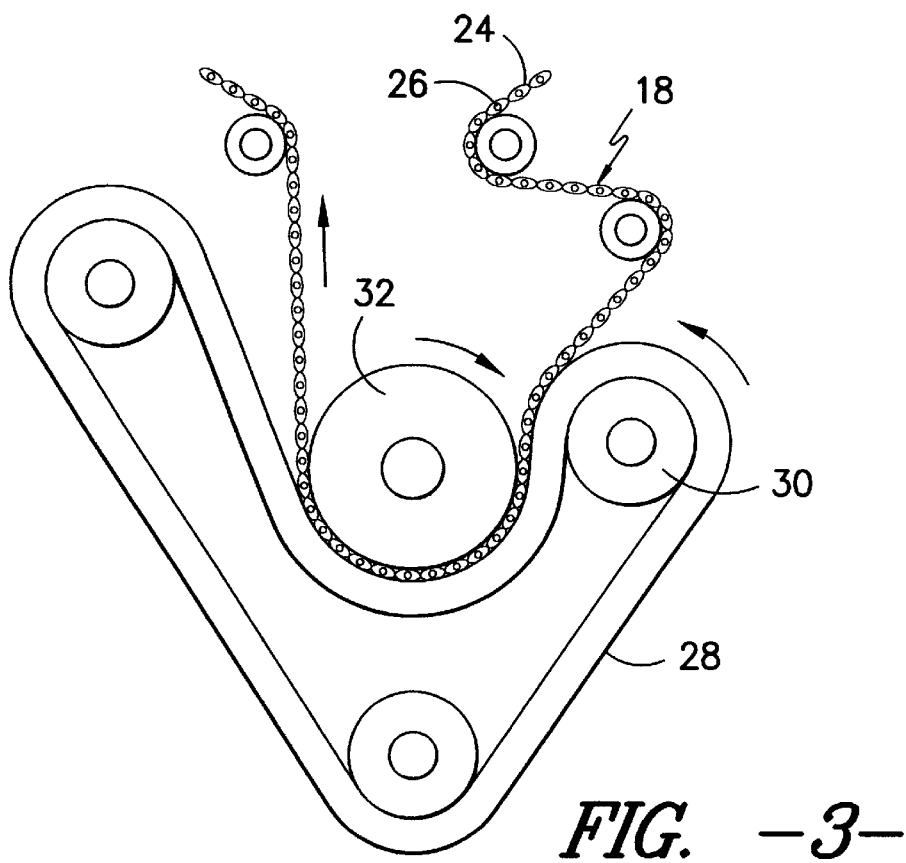
FIG. -3-
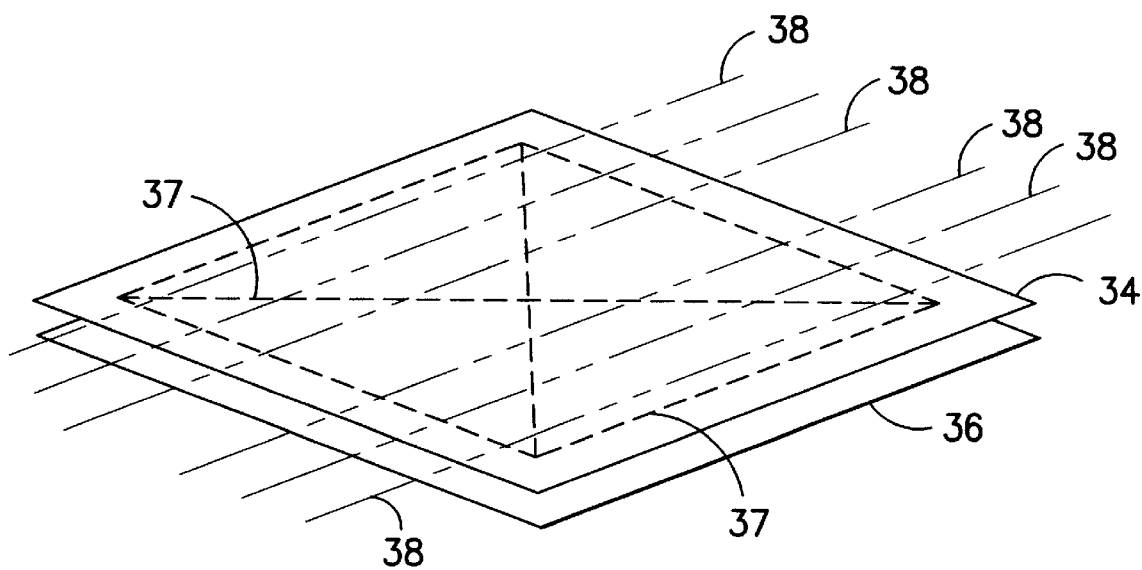
FIG. -4A-

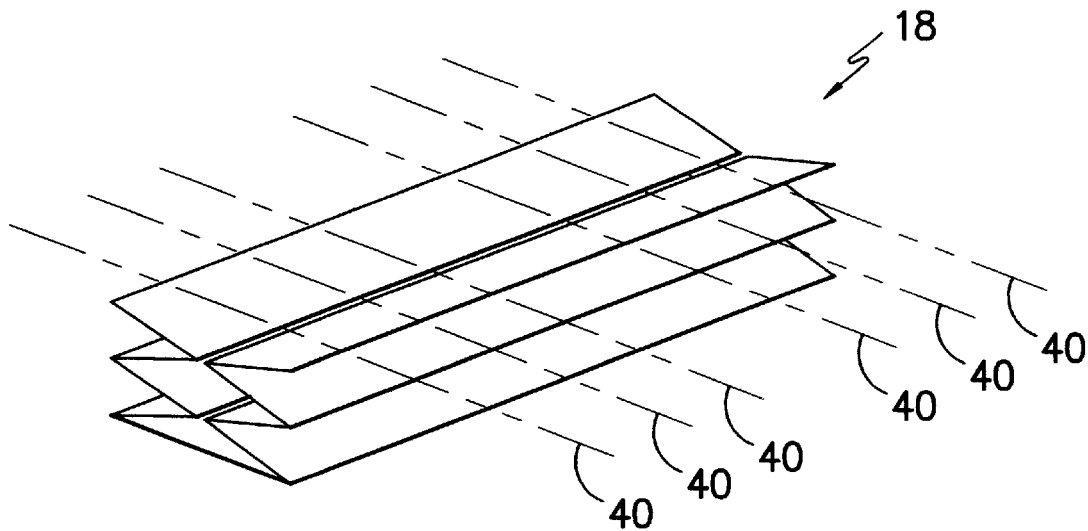
FIG. -4B-
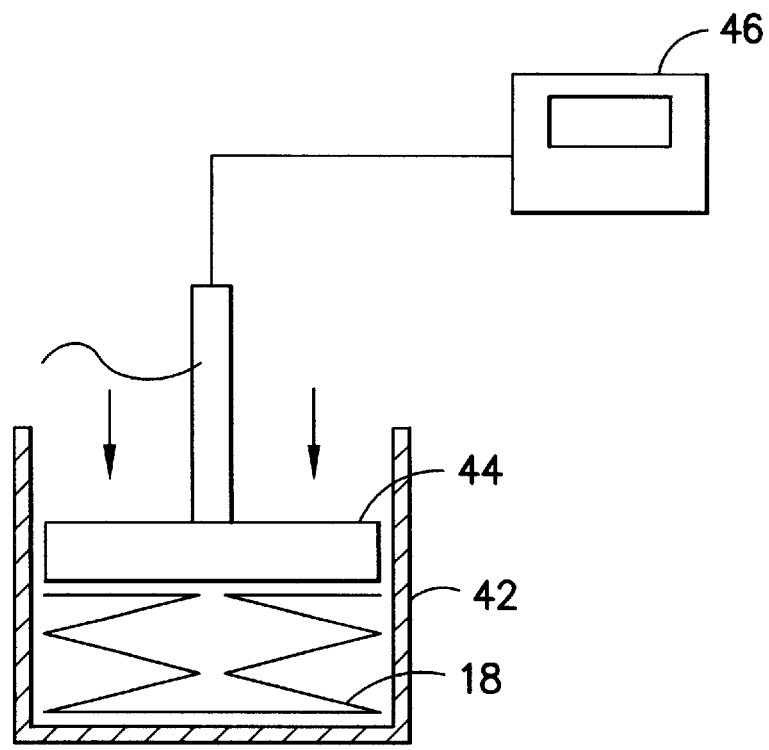
FIG. -5-

AIR BAG FABRIC POSSESSING IMPROVED PACKED VOLUME CHARACTERISTICS

FIELD OF THE INVENTION

The invention relates generally to synthetic filament yarn fabric for use in the manufacture of an air bag and more particularly to mechanically compressed fabric structures which can be packed into small volumes without unduly affecting air permeability.

BACKGROUND

Fabrics used for manufacturing air bags are required in general to possess a limited and controlled air permeability. As will be appreciated, such fabrics are generally woven structures formed from synthetic yarns made up of a plurality of individual filaments. Formation of such fabrics may be carried out on weaving machines using air-jet, water-jet or mechanical means for insertion of filling yarns between a plurality of warp yarns in a manner well known to those of skill in the art. Such woven textile materials are disclosed for example in U.S. Pat. No. 5,566,434 to Beasley, U.S. Pat. No. 5,508,073 to Krummheuer et al.; U.S. Pat. No. 5,503,197 to Bower et al.; U.S. Pat. No. 5,356,680 to Krummheuer et al.; U.S. Pat. No. 5,421,378 to Bower et al.; U.S. Pat. No. 5,277,230 to Sollars, Jr.; U.S. Pat. No. 5,259,645 to Hirabayashi et al; U.S. Pat. No. 5,110,666 to Menzel, et al.; U.S. Pat. No. 5,093,163 to Krummheuer et al.; U.S. Pat. No. 5,073,418 to Thornton et al.; U.S. Pat. No. 5,011,183 to Thornton et al.; U.S. Pat. No. 4,977,016 to Thornton et al.; U.S. Pat. No. 4,921,735 to Bloch and U.S. Pat. No. 3,814,141 to Iribe et al. (all specifically incorporated herein by reference).

As will be appreciated, very low controlled air permeabilities may be achieved through the use of coatings applied to the fabric construction. The primary coatings of use have been chloroprene (neoprene), silicone and other elastomeric resins. However, the use of such coatings presents a disadvantage from both an economic as well as a functional standpoint. Specifically, the use of coatings may add substantial cost while at the same time adding bulk to the finished product which translates to a greater folded volume of the final configuration thereby requiring a greater allocation of space within the vehicle deployment system.

In the attempt to avoid the use of coatings while at the same time achieving low and controlled air permeabilities, a number of approaches have been taken. The patents to Thornton et al. and Bloch propose the achievement of low permeability through the use of calendering to close the voids at the interstices between overlapping yarns in the fabric. While such calendering operations may reduce permeability, such operations also generally stiffen the fabric thereby increasing the volume requirements for a packed bag formed of such calendered material. Fabrics have also been produced using extremely tight weave constructions thereby packing the yarns so tightly together as to achieve the desired low air permeability. One such known construction is a 420 denier nylon 6,6 fabric having 57 threads per inch in the warp and 53 threads per inch in the fill and sold under the trade designation MICROPERM™ by Milliken & Company in LaGrange, Ga. A problem associated with this practice is once again the fact that the fabric produced may have relatively poor foldability due to the very high number of threads per inch within the woven construction which increases the stiffness and hence the packed volume requirement.

Packed volume (i.e. foldability) is becoming an increasingly important feature of air bag fabrics. Specifically, good foldability is crucial if the air bag is to be accommodated in the steering wheel of motor vehicles in the least amount of space. In addition, good foldability also makes possible the trouble-free inflation of the air bag for protecting a vehicle occupant in the event of a collision. Further, these issues of packing and trouble-free inflation become even more important as complex folding patterns are utilized to control initial impact in instances where an occupant may be directly facing the deploying cushion.

The difficulty in improving foldability is that processes which are recognized to generally improve the drape of a fabric and thereby its foldability such as for example, physical, pneumatic or hydraulic impingement practices also tend to dramatically increase the air permeability of the fabric. In U.S. Pat. No. 5,508,073 to Krummheuer et al. (incorporated by reference), it has been proposed that improved foldability of air bag fabric can be achieved without sacrificing air permeability so long as yarns having very low filament linear densities are utilized in the construction.

In light of the above, a need exists for a fabric for use in an air bag which can be produced with improved foldability without sacrificing physical properties and without being restricted to the use of low DPF yarns. The present invention provides such a fabric and methods for producing the same and therefore represents a useful advancement over the state of the art.

OBJECTS AND SUMMARY OF THE INVENTION

In recognition of the foregoing and other limitations in the prior art constructions, it is a general object of the present invention to provide an air bag fabric of improved foldability which may be constructed from a broad range of yarn types.

It is a further object of the present invention to provide an air bag fabric of improved foldability wherein such improved foldability is achieved by means of inexpensive mechanical treatment processes without substantially increasing air permeability characteristics of the fabric.

It is yet a further object of the present invention to provide an air bag fabric of improved foldability wherein such improved foldability is achieved by means of mechanical treatment processes which additionally reduce variations in physical properties across the width of the fabric as may be introduced during weaving.

Surprisingly, it has been found that the above objects of improved foldability as measured by packed volume under compressive loading and reduction in physical property variation across the width of the fabric can be achieved by mechanically compressing the fabric without adversely affecting air permeability characteristics.

Accordingly, in one aspect of the present invention a woven fabric constructed substantially of synthetic yarn is provided which has undergone processing by mechanical compression. The compressed fabric has a packed volume per unit area of fabric which is less than the packed volume per unit area of the fabric prior to mechanical compression.

In another aspect of the present invention, a woven fabric constructed substantially of synthetic yarn is provided which has undergone processing such that the compressed fabric has a packed volume per unit area of fabric which is less than the packed volume per unit area of the fabric prior to processing. In addition, the dynamic air permeability of the fabric is reduced to a level below that of the fabric prior to processing.

Other objects, features and aspects of the present invention will be apparent through reference to the description of preferred embodiments and accompanying figures as set forth below.

BRIEF DESCRIPTION OF THE DRAWINGS

A full and enabling disclosure of the present invention, including the best mode thereof, directed to one of ordinary skill in the art is set forth more particularly in the remainder of the specification including reference to the accompanying figures in which:

FIG. 1 is a cross-section view of a typical air bag installation mounted in a steering wheel of an automobile;

FIG. 2 is a view illustrating the air bag of FIG. 1, in expanded condition;

FIG. 3 is a cross-sectional schematic view of a potentially preferred processing technique for the fabric according to the present invention; and FIGS. 4A and 4B illustrate a folded construction for an air bag fabric useful in the testing of packed volume characteristics.

FIG. 5 illustrates a device for measuring packed volume of the fabric according to the present invention;

Repeat use of reference characters in the present specification and drawings is intended to represent to same or analogous features or elements of the invention.

DETAILED DESCRIPTION OF THE PREFERRED EMBODIMENTS

It is to be understood that the present description of exemplary and potentially preferred embodiments is in no way intended as limiting the broader aspects of the present invention which are to be defined solely by the metes and bounds of allowed claims and equivalents thereto.

Referring now to FIG. 1, there is illustrated a schematic cross-sectional view of a typical driver's side air bag system 10. As shown, a typical system includes a folded inflatable air bag 12 disposed within a confined module 14 housed within the steering wheel 16 or dash panel if used for passenger side restraint. The air bag 12 is typically formed from a fabric 18 and is fixed to an inflater 20 which in turn is linked to a collision detection sensor (not shown). When the deceleration of the vehicle exceeds a certain level, the collision detection sensor sends a signal to the inflator 20 thereby inducing a chemical reaction of a gas-generating agent to inflate the air bag 12 from the stowed position of FIG. 1 to the inflated position illustrated in FIG. 2 in opposed relation to a vehicle occupant 22. While in the illustrated embodiment, the module 14 is disposed within the steering wheel, it is to be appreciated that the module may also be positioned in any other location opposing a vehicle occupant including the dash panel, door panel, or forward seat as may be desired.

As will be appreciated, the material of construction for the air bag 12 typically includes at least a portion of woven fabric. Such fabric is generally woven from synthetic yarns which yarns are, in turn, formed from a plurality of filaments twisted together in known configurations. Filaments formed of polyester or nylon are generally preferred and filaments formed of nylon 6,6 may be most preferred. It is contemplated that suitable linear densities for the yarn used in the fabric according to the present invention may range from about 40 denier to about 1200 denier while the denier of the individual filaments therein may range from between 1 denier to about 10 denier.

The fabrics according to the present invention are preferably manufactured in a relatively tight construction, using either a plain or Panama weave. However, twill weaves may also be utilized if desired. By way of illustration only, and not limitation, some typical constructions for the fabric according to the present invention are set forth in Table I below.

TABLE I

| | | Nylon 6,6 Air bag Fabric | | | |
|---|---|---|---|---|---|
| Fabric | Yarn | Filament | Weave | Threads Per Inch | |
| Reference | Denier | Denier | Type | Warp | Fill |
| 1 | 210 | 6 | Plain | 71 | 71 |
| 2 | 210 | 3 | Plain | 68 | 70 |
| 3 | 315 | 6 | Plain | 60 | 60 |
| 4 | 315 | 3 | Plain | 58 | 60 |
| 5 | 315 | 3 | Plain | 56 | 57 |
| 6 | 420 | 3 | Plain | 49 | 49 |
| 7 | 420 | 6 | Plain | 52 | 56 |
| 8 | 420 | 3 | Plain | 50 | 50 |
| 9 | 630 | 6 | Plain | 41 | 41 |
| 10 | 630 | 6 | Plain | 42 | 42 |
| 11 | 630 | 3 | Plain | 39 | 41 |
| 12 | 840 | 6 | Plain | 37 | 37 |

In looking to the data of Table I, it is to be understood that filament deniers of about 3 are believed to be representative of low denier per filament constructions while deniers of about 6, are believed to be representative of regular denier per filament constructions. The designation of threads per inch is in the state to which the fabric may be finished. That is, the thread density may be achieved either on the loom or through finishing (i.e. scouring and drying). In any event, it is to be understood that these constructions are in no way intended to be limiting to the scope of the invention herein but are provided only as illustrative of air bag fabric types which may benefit from further processing to improve foldability (i.e. reduce packed volume characteristics) through further processing in accordance with the present invention.

Testing was carried out on each of the fabric constructions listed in Table I to evaluate both air permeability and packed volume characteristics before and after being subjected to further processing in accordance with the practices of the present invention. Specifically, following formation and any finishing which may have been desired to achieve the constructions as listed in Table I, the fabric was thereafter subjected to compressive forces so as to force the yarns of the fabric closer together thereby tending to increase the density (mass per unit area) of the resulting fabric by about 4–10 percent or more in comparison to that of the fabric before compression.

In a potentially preferred practice illustrated in FIG. 3, the fabric 18 made up of warp yarns 24 and fill yarns 26 is passed adjacent to and in intimate contact with a rubber belt 28 into a nip between a nip roll 30 and a heatable drum 32. At this nip, the rubber belt is elongated due to the curvature around the nip roll and the force exerted by the drum. As the rubber belt 28 exits the nip, it recoils, thereby compacting the fabric which adheres to the rubber belt 28 and slips against the surface of the drum 32. The fabric is preferably held between the belt and the drum for approximately 180° of revolution around the drum 32 so as to permit complete recoil. One potentially preferred piece of equipment for use in practicing such mechanical compression of the fabric 18 is believed to be available from Morrison Textile Machinery Corporation having a place of business at Fort Lawn, S.C.

While the particular operating parameters utilized in practice of the process as illustrated in FIG. 3 may be varied in a manner as may be desired by those of skill in the art to achieve optimum results, in general, it is believed that in order to reduce the packed volume characteristics of the fabric 18 without unduly increasing the permeability thereof or otherwise degrading the fabric, the temperature of the drum 32 should be maintained between about room temperature and about 325° F. Lower temperatures of about 250° F. or less may be preferred.

As previously indicated, it has surprisingly been found that air bag fabrics which undergo such compression actually demonstrate improved foldability on a per area basis compared to that demonstrated prior to undergoing such treatment despite the fact that the post treatment fabric is denser on an area basis. At the same time, the air permeability of the fabric is not adversely affected and, in fact, in many instances actually decreases. The fabric produced thus exhibits unexpectedly good properties for use in a folded air bag configuration wherein packed volume and air permeability represent critical parameters.

The dynamic air permeability measurements for each of the fabrics is set forth in Table II below as is the packed volume measurements for such fabric for a fixed area of fabric both before and after processing. The fabric reference designations correspond to those set forth in Table I.

TABLE II

Nylon 6,6 Air Bag Fabric

| | PRE-TREATMENT | | POST-TREATMENT | |
| --- | --- | --- | --- | --- |
| Fabric Reference | Packed Volume at 0.4 Pounds Force Per in$^2$ | Dynamic Air Perm at 50 KPa | Packed Volume at 0.4 Pounds Force Per in$^2$ | Dynamic Air Perm at 50 KPa |
| 1 | 25 in$^3$ | 1300 mm/sec | 21 in$^3$ | 1200 mm/sec |
| 2 | 24 in$^3$ | 850 mm/sec | 21 in$^3$ | 900 mm/sec |
| 3 | 31 in$^3$ | 1620 mm/sec | 23 in$^3$ | 1440 mm/sec |
| 4 | 28 in$^3$ | 1210 mm/sec | 25 in$^3$ | 1430 mm/sec |
| 5 | 33 in$^3$ | 614 mm/sec | 27 in$^3$ | 611 mm/sec |
| 6 | 30 in$^3$ | 1910 mm/sec | 27 in$^3$ | 1580 mm/sec |
| 7 | 42 in$^3$ | 520 mm/sec | 32 in$^3$ | 628 mm/sec |
| 8 | 36 in$^3$ | 753 mm/sec | 30 in$^3$ | 672 mm/sec |
| 9 | 38 in$^3$ | 1490 mm/sec | 34 in$^3$ | 1480 mm/sec |
| 10 | 55 in$^3$ | 570 mm/sec | 49 in$^3$ | 703 mm/sec |
| 11 | 35 in$^3$ | 644 mm/sec | 31 in$^3$ | 722 mm/sec |
| 12 | 44 in$^3$ | 1200 mm/sec | 36 in$^3$ | 1050 mm/sec |

As indicated, the air permeability measurements set forth in Table II above are for dynamic air permeability which represents the performance of the fabric under instantaneous application of a differential pressure. Such dynamic testing is believed to provide a more realistic portrayal of fabric performance in an air bag during a collision event wherein the bag is inflated within a few milliseconds. In actually carrying out the testing procedures, the equipment is set at a particular differential pressure desired. The set pressure is then built up within a cylinder and exhausted quickly across the fabric. The measurement in millimeters per second represents the flow of a volume of gas (mm$^3$) through a given area of fabric (mm$^2$) within a short length of time (sec) upon application of a defined differential pressure drop across the fabric.

In reference to the data of Table II, values are provided for packed volume of both the pre-treatment and post-treatment fabric at an applied pressure of 0.4 pounds force per in$^2$. While performance parameters at a specific pressure have been listed, it is to be understood that such measurements are only for purposes of comparative evaluation between fabric which has undergone treatment to enhance foldability and fabric which has not undergone such treatment evaluated under comparable conditions.

The comparative evaluation of packed volume characteristics for treated and untreated fabric as set forth in Table II was carried out using a testing technique and apparatus substantially as illustrated in FIGS. 4A, 4B and 5. Specifically, two square fabric panels 34, 36 having a length of 28 inches on each side as illustrated in FIG. 4A were placed in overlying relation to one another so as to simulate the face and back of a simple air bag configuration, after which seams 37 were applied as shown. The seams were formed of 138 nylon thread at 8–12 stitches per inch. The resulting square double layered fabric configuration was then folded in a fan configuration along fold lines 38 on either side of the double layered fabric configuration to yield a substantially rectangular configuration with fan folds along either elongate boundary edge as shown in FIG. 4B. The layered fabric configuration was thereafter folded in a fan configuration along fold lines 40 at either end so as to yield a substantially square final folded configuration. For evaluation, the fabric structure folded in the manner described was placed in a test confinement chamber 42 having internal dimensions of 5 inches×5 inches. A platen 44 machined to conform with the internal dimensions of the test confinement chamber 42 is thereafter lowered into the test confinement chamber attached to an Instron tester such as will be well known to those of skill in the art. The force applied by the platen 44 is monitored by a display 46. As will be readily appreciated, the volume occupied by the fabric within the test confinement chamber for any given applied force can thus be determined by simply monitoring the displacement of the platen 44 within the confinement chamber at such applied force. Moreover, by starting with fabric samples of equal surface areas which are folded in the same manner, a true comparative evaluation of pre-treatment and post treatment performance is possible. It has been found that the application of ten pounds force applied by the platen 36 across the 25 in$^2$ opening of the test confinement chamber (i.e. 0.4 pounds force per in$^2$) provides good reproducibility in the evaluation.

As can be seen through reference to Table II, the packed volume of the pre-treatment fabric was in each case greater than the packed volume of the post-treatment fabric when measured under the same applied pressure. In addition, this beneficial result was achieved without substantially increasing air permeability of the fabric.

In addition to the above-identified advantages of improved foldability with retained air permeability character, the processed fabric according to the present invention is believed to provide the further benefit of reducing any variation in physical properties such as air permeability which may exist across the width of a woven fabric. These variations are generally understood to be due to different levels of residual stress induced during the weaving process. Such stresses may differ from yarn to yarn and machine to machine due to slight differences in gripping mechanisms and yarn beat-up. Such residual stresses introduced during the weaving operation can be reduced by balancing the uneven yarn crimp as may exist across the fabric width. This may be achieved by subjecting the fabric to mechanical compression in accordance with the preferred practice of the present invention.

The advantages of the fabric according to the present invention can thus be seen to result in a more compact air bag system which does not sacrifice air permeability thereby providing designers with additional flexibility in choices regarding the use of such systems. The air bag system comprises the air bag itself, the accommodation for the air bag in the vehicle, and the control system for releasing the air bag function.

Other embodiments of the invention will, of course, be apparent to those skilled in the art from consideration of the specification and practice of the invention disclosed herein. However, it is intended that the specification and example contained herein be considered as exemplary only, with the true spirit and scope of the invention being defined only by allowable claims and equivalents thereto.

What is claimed is:

1. A method of producing an airbag fabric comprising the steps of:
   (a) providing a preliminary woven fabric constructed substantially of synthetic yarns wherein the preliminary woven fabric has a reference packed volume per unit area; and
   (b) mechanically forcing together the yarns of the preliminary woven fabric to yield a compressed woven fabric having a mass per unit area at least 4 percent greater than the mass per unit area of the preliminary woven fabric wherein the resulting packed volume per unit area of the compressed woven fabric is less than said reference packed volume per unit area of the preliminary woven fabric under substantially equivalent measurement conditions.

2. The invention as set forth in claim 1, wherein said preliminary woven fabric is a loom-state fabric.

3. The invention as in claim 1, wherein the dynamic air permeability of the compressed woven fabric is lower than the dynamic air permeability of the preliminary woven fabric.

4. The invention as in claim 1, wherein the dynamic air permeability of the compressed woven fabric is not greater than about 1600 mm/sec. at an average instantaneous different pressure of 50 KPa.

5. The invention as in claim 1, wherein step (b), the packed volume per unit area of the compressed woven fabric is at least about 8 percent less than the reference packed volume per unit area of the preliminary woven fabric.

* * * * *